(12) United States Patent
Häberle et al.

(10) Patent No.: US 12,447,476 B2
(45) Date of Patent: Oct. 21, 2025

(54) METHOD FOR DETERMINING THE LAYER HEIGHT OF A FEED MATERIAL SUPPLIED TO A CRUSHING AND/OR SCREENING PLANT OF A MATERIAL PROCESSING DEVICE

(71) Applicant: Kleemann GmbH, Göppingen (DE)

(72) Inventors: Steffen Häberle, Herbrechtingen (DE); Till Krauss, Rechberghausen (DE); Jochen Meier, Hülben (DE)

(73) Assignee: Kleemann GmbH, Göppingen (DE)

( * ) Notice: Subject to any disclaimer, the term of this patent is extended or adjusted under 35 U.S.C. 154(b) by 332 days.

(21) Appl. No.: 18/171,445

(22) Filed: Feb. 20, 2023

(65) Prior Publication Data

US 2023/0285982 A1    Sep. 14, 2023

(30) Foreign Application Priority Data

Mar. 8, 2022    (DE) .................... 10 2022 105 346.6

(51) Int. Cl.
*B02C 25/00* (2006.01)
*B02C 23/02* (2006.01)
*B02C 23/08* (2006.01)

(52) U.S. Cl.
CPC ............ *B02C 25/00* (2013.01); *B02C 23/02* (2013.01); *B02C 23/08* (2013.01)

(58) Field of Classification Search
CPC ......... B02C 25/00; B02C 23/02; B02C 23/00; B02C 23/08
See application file for complete search history.

(56) References Cited

U.S. PATENT DOCUMENTS

| | | |
|---|---|---|
| 4,749,273 A | 6/1988 | Reinhold |
| 11,383,246 B2 | 7/2022 | Eckert et al. |
| 2018/0369829 A1* | 12/2018 | Kaartinen ............... B02C 25/00 |

FOREIGN PATENT DOCUMENTS

| | | | | |
|---|---|---|---|---|
| AT | 523812 A1 | 11/2021 | | |
| DE | 3411540 A1 * | 10/1985 | .......... | G01F 23/292 |
| DE | 102012016332 B4 | 11/2016 | | |
| DE | 102017124958 A1 | 4/2019 | | |
| WO | WO-2014029493 A1 * | 2/2014 | ............. | B65G 47/19 |

OTHER PUBLICATIONS

Translation of WO-2014029493.*
Translation of DE-3411540.*

(Continued)

*Primary Examiner* — Bobby Yeonjin Kim
(74) *Attorney, Agent, or Firm* — Lucian Wayne Beavers; Patterson Intellectual Property Law, PC

(57) ABSTRACT

The invention relates to a method for determining the layer height of a feed material, which is supplied to a crushing and/or screening plant of a material processing device, wherein a conveyor device is used to convey the feed material in a conveying direction, wherein a sensor array comprising a plurality of sensors is used to determine the layer height of the feed material. A reliable method that can be performed with little effort and without impairing the operation of the material processing device is achieved by the longitudinal axes of the detection volumes of the sensors extending at least partially in and/or counter to the conveying direction.

21 Claims, 2 Drawing Sheets

(56) References Cited

OTHER PUBLICATIONS

German office action for corresponding patent application No. 10 2022 105 346.6, dated Nov. 11, 2022, 8 pages.
German office action for corresponding patent application No. 10 2022 105 343.1, dated Nov. 9, 2022, 8 pages.
Corresponding co-pending U.S. Appl. No. 18/171,442, filed Feb. 20, 2023.

* cited by examiner

METHOD FOR DETERMINING THE LAYER HEIGHT OF A FEED MATERIAL SUPPLIED TO A CRUSHING AND/OR SCREENING PLANT OF A MATERIAL PROCESSING DEVICE

BACKGROUND OF THE DISCLOSURE

Field of the Disclosure

The invention relates to a method for determining the layer height of a feed material, which is supplied to a crushing and/or screening plant of a material processing device, wherein a conveyor device is used to convey the feed material in a conveying direction, wherein a sensor array comprising a plurality of sensors is used to determine the layer height of the feed material on the conveyor device, wherein the sensors each detect waves, which are reflected at the feed material at least partially along detection volume of respective sensors, as signals, and wherein the detection volumes each have a longitudinal axis, which extends in the direction of the extension of length of the respective detection volumes.

The invention also relates to a material processing device having a crushing and/or screening plant, wherein a conveyor device is used to convey a feed material to the crushing and/or screening plant in a conveying direction, wherein a sensor array comprising a plurality of sensors is provided, by means of which a layer height of the feed material on the conveyor device can be determined, wherein the sensors are each designed to detect waves, which are reflected at the feed material at least partially along detection volume of respective sensors as signals, and wherein the detection volumes each have a longitudinal axis, which extends in the direction of the extension of length of the respective detection volumes.

DESCRIPTION OF THE PRIOR ART

Such material processing devices of the type mentioned above are used, for instance, for crushing and/or sorting feed material, in particular rock material such as natural stone, concrete, bricks or recycled material. The material to be processed is fed to a feed unit of the material processing device, for instance in the form of a hopper, and fed to a crusher and/or a screen via a conveyor device, for instance a vibratory feeder or a belt conveyor. A pre-screen unit can be installed upstream of the crusher, for instance to pass a fine fraction or a medium fraction, which already has a suitable grain size, past the crusher.

The efficiency and cost-effectiveness of such material processing devices depend to a large extent on a demand-oriented feed of the feed material. If, for instance, a crusher is overfilled, this leads to high mechanical loads and excessive wear. If it is underfilled, the desired quality of the end product is no longer achieved. In screening plants, on the other hand, the separation efficiency decreases noticeably with increasing layer thickness on the screen lining. Thus, in order to be able to operate material processing devices and, in particular, crushing and/or screening plants in favorable operating ranges, it is necessary to regulate the feed.

For instance, operating parameters such as crusher filling level, capacity utilization of the drive system or operating loads occurring at the crusher or screen can be determined and used to regulate the feed. Consequently, the system can react to an overload or underload. It may also be desirable to determine a layer height of the conveyed feed material.

One way to determine the layer height is to use sensors that employ a measurement principle based on the detection of waves.

DE 3411540 A1 describes a method for determining a material flow rate of belt conveyors. For this purpose, laser distance measuring devices are provided in a housing located above the surface of a bulk material on a conveyor belt. The laser distance measuring devices consist of one transmitter part and one receiver part each. The transmitter parts send laser pulses to the surface of the bulk material, where they are reflected and thus reach the receiver parts. The distance to the surface is evaluated based on the pulse time delay. The laser distance measuring devices are disposed side by side transverse to a conveying direction of the conveyor belt.

In material processing devices, superstructures above the conveyor device are often undesirable, as they can, for instance, impair the accessibility of the conveyor device or any existing feed units such as feed hoppers. Particularly in the case of mobile material processing equipment, additional requirements for a low installation height have to be observed.

SUMMARY OF THE DISCLOSURE

The invention addresses the problem of providing a method by means of which the layer height of a feed material supplied to a material processing device can be determined reliably, with little effort and without impairing the operation of the material processing device. The invention further addresses the problem of providing a material processing device adapted to perform such a method.

The layer height can be the extent of the conveyed feed material, for instance, in the direction of gravity or in a direction perpendicular to a supporting surface of the conveyor device on which the feed material rests. A conveying volume can be determined from the layer height in conjunction with the conveying speed, for instance.

The problem relating to the method is solved in that the longitudinal axes of the detection volumes extend at least partially in and/or counter to the conveying direction F. The direction of the longitudinal axes of the detection volumes thus has at least one component in the direction of and/or counter to the conveying direction. The conveying direction can be understood to denote the mean direction of motion of the material conveyed by the conveyor device. When using conveyor belts, the conveying direction can thus largely be equal to the direction of motion of the conveyor belt.

Waves can be, for instance, pressure waves such as acoustic or ultrasonic waves, or electromagnetic waves such as light, radar, X-ray, radioactive or UV or infrared radiation.

On the one hand, sensors can be understood to denote detectors that are designed to detect waves, such as cameras or camera chips or microphones. On the other hand, sensors can also be understood to denote units that comprise both transmitter and detector and thus can both emit and detect waves. In particular, distance measuring devices and/or speed measuring devices can also be considered to be sensors.

Waves that are reflected and/or scattered by the feed material and thrown in the direction of the sensor can be detected. In particular, the sensor can be reached by waves that can travel along straight lines from the feed material to the sensor. The totality of these straight lines is encompassed by a detection volume of the sensor. The detection volume may be equal to a small diameter cylinder, approximately a line leading from the feed material to the sensor, for instance when using a laser. In this case, a longitudinal axis of the detection volume approximately coincides with the detection volume. However, the detection volume can also be shaped differently, in particular like a cone or a lobe, such as a radar lobe. If the detection volume is shaped like a cone, the longitudinal axis of the detection volume is equal to the central longitudinal axis of the cone.

If the longitudinal axes of the detection volumes extend at least partially in and/or counter to the conveying direction F, the sensors do not have to be mounted above the conveyor device. In general, greater freedom in positioning of the sensors is gained. For instance, they can be positioned at a greater distance from the conveyor device and/or the screening and/or crushing plant in or counter to the conveying direction. Thus, the sensors can be accommodated where, on the one hand, they interfere as little as possible with the operation of the material processing devices, and where, on the other hand, they are at least partially or largely protected from contamination, from the risk of mechanical destruction by material to be processed, or from vibrations. In addition, the component is made accessible for measurements in the conveying direction. For instance, this component can be used for speed measurements.

The sensors of the sensor array can be actuated, for instance, by a control device of the material processing device or by a control device of the sensor array. The evaluation of the signals can be performed by an evaluation device, for instance. However, it is also conceivable that the sensors can evaluate the signals, in particular if they are present as measuring devices such as speed or distance measuring devices.

Predictive process parameters such as the layer height of the fed feed material can, for instance, be used for a regulation system to at least largely prevent the occurrence of overload and/or underload situations. In this way, the production process and consequently machine utilization, fuel efficiency, and the quality of intermediate and end products can be improved.

According to the invention, provision can also be made for a layer height range to be assigned to every sensor, and for the sensors to be used to determine whether feed material is located in the respective layer height ranges. For instance, at least two, preferably at least three, particularly preferably at least four, further preferably five, in particular six layer height ranges can be provided. For instance, the layer height ranges may each cover 100 mm each, such that a first layer height range may cover, for instance, the range <100 mm, a second layer height range may cover 100-200 mm, etc. Preferably, one sensor can be assigned to every layer height range. However, provision may also be made for not assigning any sensor to some layer height ranges, e.g. <100 mm. It is also conceivable to provide more than one sensor for one or more layer height ranges. Thus, the sensors do not necessarily have to be able to measure distance, but only have to determine whether there is feed material in a particular layer height range. Thus, if a sensor determines that there is material in a relevant layer height range, the layer height of the feed material can be deduced therefrom.

If provision is made for the sensors and/or an evaluation circuit to only take into account feed material that is within a set gauge distance from the sensors, then the layer height of the feed material can be determined particularly reliably. In particular, if the longitudinal direction of the measuring volumes does not extend in parallel to the conveying direction, falsified layer heights may otherwise result due to material taken into account outside the set gauge distance. The gauge distance can be a distance, for instance, in the conveying direction and/or in the horizontal direction. For instance, only one signal may be evaluated, which is assigned to an area within the gauge distance, for instance, on the basis of a pulse time delay.

According to an advantageous further development of the invention it is proposed, that the sensors are disposed transversely to the conveying direction, one above the other in the direction of gravity, preferably at least partially perpendicular to the conveying direction F, in particular are lined up indirectly or directly at least partially perpendicular to the conveying direction F. This results in a compact design of the sensor array. The sensors can be oriented in parallel to each other in such a way that the longitudinal axes of the detection volumes of the sensors extend in parallel. Preferably, the sensors are oriented such that the longitudinal axes of the sensors diverge, wherein provision may preferably be made for the sensors to be oriented in a convex, in particular circular arc-shaped, sensor arrangement.

According to the invention, provision may be made for the longitudinal axes of the detection volumes to extend at an angle α of smaller than 45°, preferably smaller than 30°, particularly preferably smaller than 15°, relative to the conveying direction F.

A variant of the invention may be characterized in that the sensors are radar sensors and/or ultrasonic sensors and/or laser distance sensors and/or laser Doppler vibrometers. Such sensors are available at low cost and are sufficiently robust for use under possibly harsh operating conditions, such as may exist in material processing devices. In addition, such sensors can be used to reliably detect feed material. In particular when using radar sensors and/or ultrasonic sensors and/or laser Doppler vibrometers, speeds of the feed material can also be measured.

According to an advantageous embodiment of the invention, it is proposed that the measurement volumes do not overlap within the set gauge distances, in particular that the detection volumes have vertical aperture angles β that are smaller than 10°, preferably smaller than 7.5°, more preferably smaller than 5°. In that way, a reliable allocation of detected feed material to the measuring volumes of the sensors can be implemented. In particular, any detected feed material can be reliably allocated to a certain layer height range. Alternatively, provision can also be made for the measuring volumes to overlap only slightly within the set gauge distance. In particular, the angles γ between the measuring volumes can also be designed such that no or only a slight overlap occurs within the gauge distance.

One variant of the invention may be such that the sensor array is formed from separate sensors. Alternatively, provision can also be made for the sensor array to be designed as a structural unit consisting of several sensors. In this way, a simplified assembly of the sensor array can be achieved. In addition, a structural unit can contribute to a higher mechanical stability and thus to a more robust design and a lower susceptibility to errors in measurement. In particular, if the structural unit has a housing and the sensors are at least partially accommodated in the housing, the sensors are particularly well protected from external influences.

Furthermore, it is conceivable that a speed measuring device is used to determine a speed of the feed material. Incremental transducers such as metering wheels or speed measuring devices based on non-contact methods can be used as speed measuring devices.

Preferably, provision can be made for the speed measuring device to be formed by at least one of the sensors, in particular for the speed measuring device to be formed by several of the sensors, and preferably for an average speed of the feed material to be determined by means of the several sensors. In this way, no additional sensors have to be used to determine the speed of the feed material. Averaging the speeds determined by several sensors provides a more accurate result, since outliers, which can be caused by rolling feed material, for instance, have less of an effect on the measurement result.

An advantageous further development of the invention may be characterized in that a volumetric flow rate of the feed material is determined from the speed of the feed material, the layer height of the feed material and the geometry of the conveyor. In particular, the volumetric flow rate of the feed material can be used as a predictive variable for regulating the material flow.

According to one variant of the invention, provision can be made for a characteristic, in particular a rock type and/or a feed size, of the feed material to be determined by means of the sensors, preferably for the characteristic of the feed material to be determined on the basis of the reflective properties of the feed material. For instance, the intensity of the signal echo, such as a radar echo, can provide information about rock size and/or rock type. This additional information can be used, for instance, to correct a target conveying speed of the feed material, because the material characteristic has a significant effect on the processing time in the system.

Advantageously, provision can also be made for the volumetric flow of the feed material to be used to regulate the conveyor, in particular to regulate an effective conveying speed of the conveyor and/or an actuation of a pre-screen. In this way, the processing process can be homogenized, because the conveying speed can be reduced at an early stage if, for instance, there is a risk of the crusher and/or screen being filled to too high a level. Likewise, the conveying speed can be increased if the plant utilization and the predicted volumetric flow permit that. In this way, overload and underload situations can be largely prevented. This can result in improved plant utilization and thus time, cost and/or energy savings.

Alternatively or additionally, it is conceivable that the volumetric flow is used to set other parameters, such as, for instance, to set a crushing gap, a rotor speed of an impact crusher, an excitation frequency and/or an excitation amplitude of a screening plant and/or a prescreen.

According to an advantageous further development of the invention, it is proposed that the characteristic of the feed material is used to regulate the conveyor, in particular that the characteristic and the volumetric flow of the feed material are used to determine an expected dwell time of the feed material in the crushing and/or screening plant, and that the anticipated dwell time is used to regulate the effective conveying speed of the conveyor and/or an actuation of a prescreen.

The problem relating to the material processing device is solved in that the sensors are designed and/or oriented in such a way that the longitudinal axes of the detection volumes extend at least partially in and/or counter to the conveying direction F.

A material processing device according to the invention can be characterized in that the sensors are disposed at a distance from the conveyor device in and/or counter to the conveying direction.

BRIEF DESCRIPTION OF THE DRAWINGS

The invention is explained in greater detail below based on an exemplary embodiment shown in the drawings. In the Figures.

DETAILED DESCRIPTION

Figure 1:
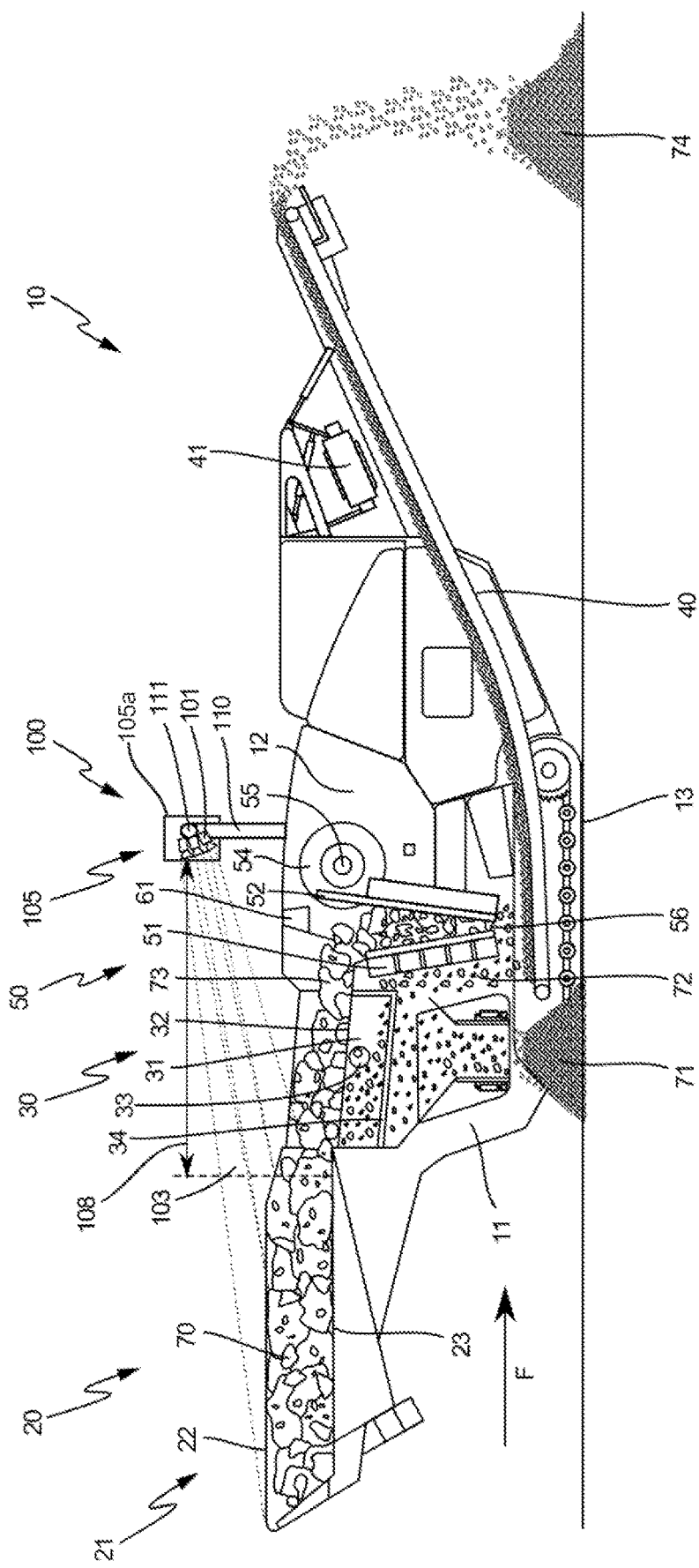
FIG. 1 shows a lateral, partially cut schematic representation of a material processing device

FIG. 1 shows a lateral, partially cut schematic representation of a material processing device 10. The material processing device 10 can be designed as a mobile unit having a chassis 11 and for instance a chain drive 13. The material processing device 10 may comprise a crushing plant 50 and/or a screening plant 30.

A hopper 21, which may have hopper walls 22, may further be provided at the material processing device 10, in particular at a feed unit 20. The hopper 21 may be used to receive feed material 70 from an upstream conveyor, such as an excavator, wheel loader, or belt conveyor, and direct it onto a conveyor device 23.

The crushing plant 50 and/or the screening plant 30 can be supplied with feed material 70 for processing in a conveying direction F by means of the conveyor device 23. In this case, the conveyor device 23 is designed as a vibratory feeder. However, other embodiments of a conveyor device 23, in particular as a conveyor belt, are also conceivable. The conveyor device 23 may also be referred to as a conveyor 23.

The screening plant 30 may, for instance, be connected upstream of the crushing plant 50 as a pre-screen unit. The pre-screen unit may comprise a heavy-duty double-deck screen 31, which may have an upper deck 32 designed as a coarser screen and a lower deck 34 designed as a finer screen. A drive 33 causes it to vibrate in a circular motion. The upper deck 32 can separate a fine fraction 71 and a medium fraction 72 from the material to be crushed 73. The lower deck 34 can separate the fine fraction 71 from the medium fraction 72. The fine fraction 71 can optionally be discharged from the material crusher plant 10 or be fed to the medium fraction 72 for instance by setting a bypass flap accordingly. The medium fraction 72 can be routed to a crusher discharge conveyor 40 past the crusher 50 via a bypass. The material to be crushed 73 is routed to the crusher 50 via a crusher inlet at the end of the pre-screen unit.

The material processing device 10 may comprise a crushing plant 50 configured as a jaw crusher. However, it is also conceivable to provide other types of crushing plants 50, for instance impact crushers, gyratory crushers or cone crushers. The crushing plant 50 may comprise a stationary crushing jaw 51 and a moving crushing jaw 52, which may be oriented to converge at an angle such that a conical tapered shaft is formed therebetween. The shaft may open out into a crushing gap 56. For instance, the crushing plant 50 may be driven by a drive unit 12 via a drive shaft 55 connected to an eccentric 54.

The eccentric 54 moves the moving crushing jaw 52 towards and away from the stationary crushing jaw 51 in an elliptical motion. In the course of such a stroke, the distance between the crushing jaws 51, 52 in the area of the crushing gap 56 also changes. The motion of the moving crushing jaw 52 causes the material 73 to be crushed to be crushed further and further along the conical shaft until it reaches a grain size that allows it to exit the shaft through the crushing gap 56. The crushed material 74 falls onto the crusher discharge belt 40, which is used to convey it along. Provision can also be made, for instance, for it to pass a magnetic separator 41, which separates ferromagnetic components from the shredded material 74 and ejects them laterally.

As further shown in FIG. 1, a level sensor 61 may be assigned to the crushing plant 50. The latter can be designed as an ultra-sound sensor. However, it is also conceivable to use other types of sensors, such as optical sensors (for instance, a camera system) or mechanically acting sensors. The level sensor 61 may monitor the level of material 73 to be crushed in the crusher 50. It may be part of a continuous feed control system of the material processing equipment 10. For this purpose, the material feeding components of the material processing device 10, in particular the conveyor device 23, can be actuated based on the signals of the level sensor 61. This can be used, for instance, to regulate the volumetric flow rate of the material 73 to be crushed that is fed to the crusher 50.

As can be further seen in FIG. 1, a sensor array 105 comprising several sensors 101 may be provided on the material processing device 10. The sensor array 105 can be used to determine a layer height of the feed material 70. In the illustrated exemplary embodiment, the sensor array 105 comprises three individual sensors 101 disposed one above the other adjacent to each other in the direction of gravity. Of course, other arrangements and in particular different numbers of sensors 101 are also conceivable. Furthermore, the sensor array 105 need not be individual sensors 101; rather, the sensor array 105 may also be formed as a structural unit. In particular, the assembly may comprise a housing 105a that at least partially houses the structural unit. The sensors 101 may be at least partially received in the housing 105a.

A sensor holding device 110 may be used to hold the sensor array 105 at the material processing device 10. The sensor holding device 110 may be a pole, to which the sensor array 105 is attached. A sensor adjustment device 111 may be used to indirectly or directly attach the sensor array 105 to the material processing device 10. In this case, the sensor holding device 110 is used to attach the sensor 105 to the material processing device 10 using a sensor adjustment device 111. For instance, the sensor adjustment device 111 may enable an articulated connection to the sensor holding device 110 such that the sensor array 105 can be swiveled, for instance, to permit different orientations of the sensor array 105. It is also conceivable to attach the sensor array 105 to the material processing device 10 and/or the sensor holding device 110 in a height-adjustable manner.

In the exemplary embodiment shown, the sensors 101 are radar sensors. However, other sensors, in particular ultrasonic sensors, laser distance sensors and/or laser Doppler sensors, in particular laser Doppler vibrometers, are also conceivable. The sensors 101 may emit waves, in this case radar waves, for instance inside a detection volume 103. If there is material, in particular feed material 70, within the detection volume 103 of a sensor 101, the waves may be reflected therefrom. A portion of the reflected waves is reflected back along the detection volume 103 to the respective sensors 101 and can be detected by them.

Figure 2:
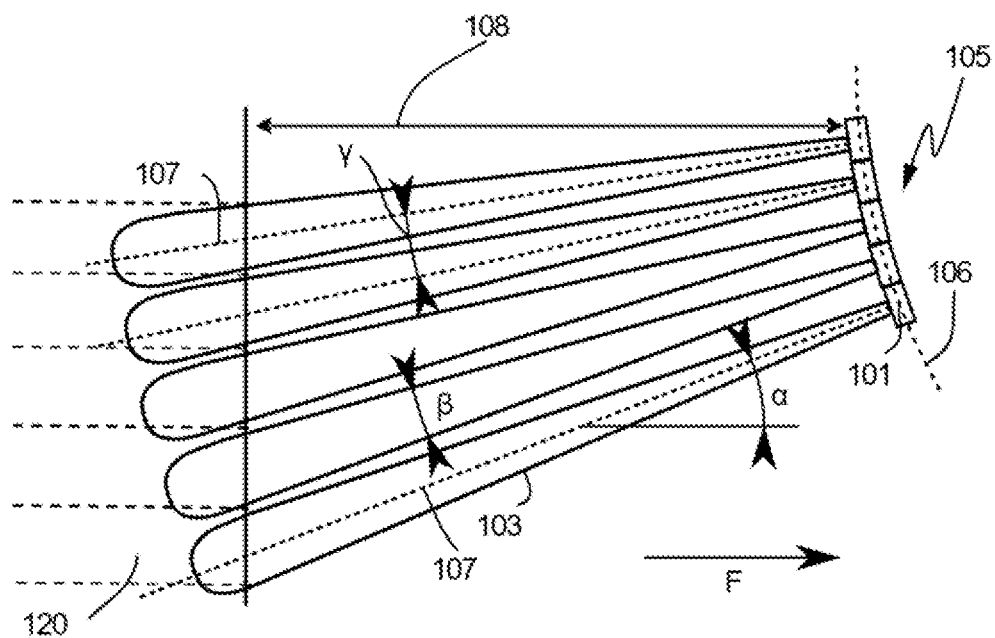
FIG. 2 shows a schematic representation of a sensor array consisting of several sensors with their respective detection volumes.

As can be seen in FIG. 1, the conveying direction F can be oriented horizontally, for instance. However, inclined conveying directions F are also conceivable, for instance, if the conveyor device 23 is inclined. As shown in FIG. 2, the detection volumes 103 may be lobe-shaped and/or tapered. In this case, they are designed to be radar lobes. However, deviating geometries of the detection volumes 103 are also conceivable. Every detection volume 103 may have a longitudinal axis 107. The longitudinal axis 107 may be the bisector of a vertical opening angle $\beta$ of the detection volume 103.

The longitudinal axes 107 of the detection volumes 103 are oriented at least partially in the direction of the conveying direction F and/or counter thereto. As can be seen from FIG. 2, the longitudinal axes 107 each forms an angle $\alpha$ with the conveying direction F. The smaller this angle $\alpha$ is, the larger is, in terms of magnitude, the component of the direction of the longitudinal axis 107 of the respective detection volumes 103 in the direction and/or counter to the direction of the conveying direction F.

The sensors 101 and/or their detection volumes 103 may be oriented such that the longitudinal axes 107 of adjacent detection volumes 103 form an angle $\gamma$ with each other, as further shown in FIG. 2. In this case, diverging longitudinal axes 107 result from the angles $\gamma$. This can be achieved, for instance, by arranging the sensors 101 in a convexly arched sensor arrangement 106.

As further shown in FIG. 2, a layer height range 120 may be assigned to every sensor 101. For instance, the layer height range 120 of a sensor 101 may be a range between a lower layer height to be detected and an upper layer height to be detected that is present in the detection volume 103 of the sensor 101 in the range of a set gauge distance 108.

For this purpose, provision can be made for a sensor 101 to evaluate, for instance, only a signal that is detected in an area within the set measuring distance 108. It can be determined, for instance, by means of a pulse time delay method. For instance, an evaluation device, which is not shown in the figures, can be provided for evaluating the pulse time delays.

A set gauge distance can be dimensioned along the conveying direction F, for instance.

As can be further seen in FIG. 2, the detection volumes 103 of the sensors 101 may be configured and/or oriented such that they do not overlap or overlap only slightly within the set gauge distance 108. In particular, the angles $\alpha$, $\beta$, $\gamma$ and the set gauge distance 108 can be matched accordingly for this purpose.

If, for instance, the layer height of the feed material 70 is now to be determined during operation of the material processing device 10, the sensors 101 can emit measuring waves, in particular radar waves, which are at least reflected by the feed material 70. The reflected measurement waves are then detected by the sensor 101 along whose detection volume 103 they are reflected. Of course, waves other than radar waves can also be used. Furthermore, preferably only signals reflected from the feed material 70 that is within the set gauge distance 108 are detected and/or evaluated.

For instance, a sensor 101 may then detect the presence of feed material 70 if any waves are reflected as a signal to the sensor 101. It is also conceivable to define a threshold value for an intensity of the signal, above which the presence of feed material 70 is to be expected. The signal can be evaluated, for instance, by means of an evaluation device that is not shown in the figures. However, the evaluation may also be performed by the sensors 101 themselves.

Every sensor 101 can thus detect whether there is feed material 70 within the set gauge distance 108 and within the layer height range 120 assigned to the sensor(s) 101. Consequently, information from several sensors 101 can be used to infer the presence of several layer height ranges 120 containing feed material 70, and thus the layer height of feed material 70.

Every sensor 101 can be used to determine the speed of the feed material 70, particularly if there is feed material 70 in the layer height range 120 assigned to the sensor. For this purpose, for instance, a Doppler speed measurement can be used. The measurement signals for speed determination can be evaluated by the sensors 101 or by an evaluation device.

The geometry of the conveyor device 23, the layer height of the feed material 70 and the speed of the feed material 70, can be used to determine a material flow, in particular a volumetric flow of the feed material 70. Provision may be made to use the volumetric flow rate of the feed material 70 to regulate the material processing device 10, in particular to regulate a fed material flow rate. For this purpose, a regulation device may be provided at the material processing device 10, which is not shown in the figures.

The invention claimed is:

1. A method for determining a layer height of a feed material supplied to a material processing device, the method comprising:
    conveying the feed material in a conveying direction on a conveyor;
    detecting signal waves reflected from the feed material with a sensor array including a plurality of sensors, each sensor having an associated detection volume having a longitudinal axis extending in a direction of a length of the detection volume, each of the longitudinal axes of the detection volumes extending at least partially in and/or counter to the conveying direction; and
    determining the layer height of the feed material based at least in part on the detected signal waves; wherein each of the sensors is configured to detect whether feed material is located in a layer height range associated with the respective sensor wherein the layer height ranges associated with at least two of the sensors are different from each other.

2. The method of claim 1, wherein:
    the determining of the layer height is based only on feed material within a set gauge distance from the sensors.

3. The method of claim 1, wherein:
    the sensors are disposed transversely with respect to the conveying direction, one above the other in a direction of gravity.

4. The method of claim 1, wherein:
    the longitudinal axes of the detection volumes extend at an angle of smaller than 45° with respect to the conveying direction.

5. The method of claim 1, wherein:
    the longitudinal axes of the detection volumes extend at an angle of smaller than 30° with respect to the conveying direction.

6. The method of claim 1, wherein:
    the longitudinal axes of the detection volumes extend at an angle of smaller than 15° with respect to the conveying direction.

7. The method of claim 1, wherein:
    the sensors are selected from the group consisting of radar sensors, ultrasonic sensors, laser distance sensors and laser Doppler vibrometers.

8. The method of claim 1, wherein:
    the determining of the layer height is based only on feed material within a set gauge distance from the sensors;
    the detection volumes do not overlap within the set gauge distance; and
    the detection volumes each have a vertical opening angle smaller than 10°.

9. The method of claim 8, wherein:
    the vertical opening angle is smaller than 7.5°.

10. The method of claim 8, wherein:
    the vertical opening angle is smaller than 5°.

11. The method of claim 1, wherein:
    the sensors of the sensor array are separate sensors.

12. The method of claim 1, wherein:
    the sensor array includes a housing and the sensors are at least partially received in the housing.

13. The method of claim 1, further comprising:
    determining a speed of the feed material using a speed sensor.

14. The method of claim 13, wherein:
    the speed sensor comprises at least one of the sensors of the sensor array.

15. The method of claim 14, wherein:
    wherein: the speed sensor comprises the plurality of the sensors of the sensor array; and the speed of the feed material is determined as an average speed determined by the plurality of the sensors of the sensor array.

16. The method of claim 13, further comprising:
    determining a volumetric flow rate of the feed material from the speed of the feed material, the layer height of the feed material and a geometry of the conveyor.

17. The method of claim 16, further comprising:
    determining a rock type and/or a feed size of the feed material based at least in part on a reflection property of the feed material detected by the sensors.

18. The method of claim 17, further comprising:
    determining an anticipated dwell time of the feed material in the material processing device based at least in part on the rock type and/or the feed size of the feed material and based at least in part on the volumetric flow rate of the feed material; and
    regulating an effective conveying speed of the conveyor based at least in part on the anticipated dwell time.

19. The method of claim 16, further comprising:
    regulating an effective conveying speed of the conveyor based at least in part on the volumetric flow rate.

20. A material processing device, comprising:
    a conveyor configured to convey feed material in a conveying direction; and
    a sensor array including a plurality of sensors configured to detect signal waves reflected from the feed material to determine a layer height of the feed material on the conveyor, each sensor having an associated detection volume having a longitudinal axis extending in a direction of a length of the detection volume, the sensors being oriented such that longitudinal axes of the detection volumes extend at least partially in and/or counter to the conveying direction, wherein each of the sensors is configured to detect whether feed material is located in a layer height range associated with the respective sensor wherein the layer height ranges associated with at least two of the sensors are different from each other.

21. The material processing device of claim 20, wherein:
    the sensors are disposed at a distance from the conveyor in and/or counter to the conveying direction.

* * * * *

UNITED STATES PATENT AND TRADEMARK OFFICE
CERTIFICATE OF CORRECTION

| | |
|---|---|
| PATENT NO. | : 12,447,476 B2 |
| APPLICATION NO. | : 18/171445 |
| DATED | : October 21, 2025 |
| INVENTOR(S) | : Steffen Häberle |

It is certified that error appears in the above-identified patent and that said Letters Patent is hereby corrected as shown below:

In the Claims

Column 10, Line 17, Claim 15 Delete the word "wherein:"

Signed and Sealed this
Thirteenth Day of January, 2026

John A. Squires
*Director of the United States Patent and Trademark Office*